(12) United States Patent
Dickson et al.

(10) Patent No.: US 10,094,464 B2
(45) Date of Patent: Oct. 9, 2018

(54) THERMOELECTRIC GENERATOR FOR TRANSMISSION WARM-UP

(71) Applicant: GM Global Technology Operations LLC, Detroit, MI (US)

(72) Inventors: Douglas Dickson, White Lake, MI (US); Lawrence P. Ziehr, Clarkston, MI (US); James R. Salvador, Royal Oak, MI (US); Daniel J. Shepard, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 7 days.

(21) Appl. No.: 15/228,944

(22) Filed: Aug. 4, 2016

(65) Prior Publication Data
US 2018/0038473 A1   Feb. 8, 2018

(51) Int. Cl.
| | | |
|---|---|---|
| F01N 3/00 | (2006.01) | |
| F01N 3/02 | (2006.01) | |
| F16H 57/04 | (2010.01) | |
| B60H 1/22 | (2006.01) | |
| F01N 5/02 | (2006.01) | |
| F01N 9/00 | (2006.01) | |
| F01P 5/10 | (2006.01) | |

(52) U.S. Cl.
CPC ....... *F16H 57/0413* (2013.01); *B60H 1/2225* (2013.01); *F01N 5/025* (2013.01); *F01N 9/00* (2013.01); *F01P 5/10* (2013.01); *F16H 57/0415* (2013.01); *F16H 57/0475* (2013.01)

(58) Field of Classification Search
CPC ............. F01N 2240/02; F01N 2240/16; F01N 3/0234; F01N 3/0205; F01N 3/2053; F01N 13/004; F01N 2260/02; F01N 2260/024

USPC .................................................. 60/298, 320
See application file for complete search history.

(56) References Cited

U.S. PATENT DOCUMENTS

| | | | |
|---|---|---|---|
| 6,772,715 B2 | 8/2004 | Pfeffinger et al. | |
| 7,077,776 B2 | 7/2006 | Sorab et al. | |
| 8,341,950 B2 * | 1/2013 | Bidner | F01N 5/025 |
| | | | 136/201 |
| 8,418,799 B2 * | 4/2013 | Richter | F01N 5/025 |
| | | | 180/309 |

(Continued)

FOREIGN PATENT DOCUMENTS

KR   2013-0034856   *   4/2013

*Primary Examiner* — Phutthiwat Wongwian
*Assistant Examiner* — Diem Tran

(57) ABSTRACT

A vehicle, system, and method of warming the transmission fluid with a thermoelectric generator is also provided. Disclosed is vehicle having an internal combustion engine, a transmission containing a transmission fluid, a coolant circuit configured to remove heat from the engine, and a thermoelectric generator. The thermoelectric generator is in non-contact thermal communication with the hot exhaust gas produced by the engine and the relatively cooler coolant circulating through the coolant circuit. The thermoelectric generator produces a current from the temperature gradient between the exhaust gas relative and coolant and transfers heat from the exhaust gas to the coolant. The heat coolant is conveyed to a transmission heat exchanger to heat the transmission fluid. A heating element is disposed in thermal contact with the transmission fluid and the heating element is powered by the electric current produced by the thermoelectric generator.

1 Claim, 2 Drawing Sheets

(56) References Cited

U.S. PATENT DOCUMENTS

| | | | |
|---|---|---|---|
| 8,443,594 B2 * | 5/2013 | Prior | F01N 5/025 |
| | | | 136/201 |
| 8,463,495 B2 | 6/2013 | Spohn et al. | |
| 8,763,376 B2 * | 7/2014 | Garnepudi | F01P 3/20 |
| | | | 123/41.05 |

* cited by examiner

THERMOELECTRIC GENERATOR FOR TRANSMISSION WARM-UP

TECHNICAL FIELD

The present invention generally relates to the thermal management of a powertrain having an internal combustion engine and a transmission, and more particularly to systems and methods for capturing the waste heat of an internal combustion engine to selectively warm the transmission fluid of a vehicle.

BACKGROUND

Internal combustion engines are used to power vehicles by converting chemical energy into mechanical energy, which may be further converted into electrical energy. The mechanical energy is transferred to a transmission that selects the proper gearing to drive the vehicle. The chemical energy supplied to an internal combustion engine is typically in the form of a refined fossil fuel such as gasoline or diesel fuel, or a distilled alcohol such as ethanol. Only a portion of the heat produced from the combustion of the fuel in an internal combustion engine is converted into useful mechanical energy and/or used to provide passenger comfort, the remaining heat is wasted through the cooling and exhaust systems of the vehicle.

Automatic transmissions typically use a transmission fluid, which may be petroleum based or synthetic, as a lubricating fluid for the internal components of the transmission and as a hydraulic fluid to active clutches for proper gear ratio selections. During initial startup of the vehicle, the temperature of the transmission fluid is approximately that of the temperature of the ambient air, which during cold winter months would cause the fluid to be highly viscous, resulting in transmission spin loss (i.e. energy loss), increased component wear, and reduced fuel economy until the transmission fluid reaches operating temperature.

Accordingly, there is a need to increase the efficiency of the internal combustion engine by converting a portion the wasted heat into beneficial use. It is beneficial to capture the waste heat in the vehicle cooling and exhaust systems to preheat or warm the transmission fluid during initial vehicle startup for improved efficiency as well as improved longevity of the transmission.

SUMMARY

In one embodiment, a vehicle having a thermal electric generator for capturing the waste heat of an engine for selectively warming the transmission fluid of a transmission is provided. The internal combustion engine includes an engine coolant passageway in fluid connection with a coolant circuit for removing waste heat from the engine, and an exhaust conduit operable to convey a flow of hot exhaust gas away from the engine. A thermoelectric generator, having a hot-side in thermal contact with the exhaust conduit and a cold-side in thermal contact with the coolant circuit, is disposed downstream of the engine coolant outlet. An electric current is generated from the temperature gradient between the higher temperature exhaust gas and lower temperature coolant, and heat is transferred from the higher temperature exhaust gas to the relatively lower temperature coolant flowing through the coolant circuit. A transmission heat exchanger is disposed in the coolant circuit downstream of the thermoelectric generator.

The vehicle may further include an electrical heating element in thermal communication with the transmission heat exchanger or configured to provide heat to a passenger compartment of the vehicle. The heating element may be powered by the electrical current generated by the thermoelectric generator. A control module may be provided to selectively disconnect power to the heating element.

The coolant circuit may include an auxiliary coolant pump downstream of the engine coolant outlet and upstream of the thermoelectric generator. The auxiliary coolant pump maybe configured to provide a first flowrate through the thermoelectric generator when the temperature of the coolant immediately prior to the thermoelectric generator is above a first predetermined temperature, and a second flowrate through the thermoelectric generator when the temperature of the coolant immediately after the thermoelectric generator is above a second predetermined temperature higher than the first predetermined temperature, wherein the second flowrate is greater than the first flow rate.

The coolant circuit may further include a transmission heat exchanger bypass path and a bypass valve disposed in the coolant circuit upstream of the transmission heat exchanger. The bypass valve includes a first position configured to direct coolant flow through the bypass path, thereby bypassing the transmission heat exchanger, and a second position configured to direct coolant flow through the transmission heat exchanger.

In another embodiment, a transmission warming system for a vehicle having an internal combustion engine is provided. The transmission warming system includes a heating loop configured to circulate a coolant through an internal combustion engine of the vehicle, an auxiliary pump operable to circulate the coolant through the heating loop, a thermoelectric generator disposed in the heating loop downstream of the auxiliary pump. The thermoelectric generator includes a coolant passageway in fluid connection with the heating loop and an exhaust gas passageway. A transmission heat exchanger is disposed in the heating loop downstream of the thermoelectric generator. The transmission heat exchanger includes a coolant passageway in fluid communication with the heating loop and a transmission fluid passageway in fluid communication with the transmission.

The transmission warming system may further include an electric heating element in thermal communication with the transmission fluid passageway of the transmission heat exchanger, a transmission heat exchanger bypass loop, and valve disposed in the heating loop upstream of the transmission heat exchanger. The valve includes a first position configured to direct coolant flow through the bypass loop, thereby bypassing the transmission heat exchange, and a second position configured to direct coolant flow through the transmission heat exchanger.

Yet in another embodiment, a method of warming a transmission on a vehicle having an internal combustion engine is provided. The method includes the steps of starting the internal combustion engine, thereby generating a hot exhaust gas, circulating a coolant through a heating loop in fluid communication with the internal combustion engine, passing the hot exhaust gas through a hot-side of a thermoelectric generator, and passing the relatively lower temperature coolant through the cold-side of the thermoelectric generator, thereby generating an electric current and transferring heat from the exhaust gas to the coolant. The method further includes circulating a portion of transmission fluid from a transmission through a transmission heat exchanger and circulating the heated coolant exiting the cold-side of the thermoelectric generator through the transmission heat exchanger to transfer heat from the heated coolant to the transmission fluid when the ambient air temperature is above a predetermined ambient temperature or when the internal combustion engine is above a predetermined engine temperature.

The method may further include the step of increasing the flowrate of coolant through the cold-side of the thermoelectric generator to a first increased flow rate (F1) when the temperature of the coolant immediately upstream of the thermoelectric generator is greater than a predetermined inlet temperature; and further increasing the flowrate of coolant through the cold-side of the thermoelectric generator to a second increased flow rate (F2) when the temperature of the heated coolant immediately downstream of the thermoelectric generator is greater than a predetermined outlet temperature, wherein the second increased flowrate is greater than the first increased flow rate (F2>F1).

The method may further include the step of continuing to circulate the coolant with an auxiliary coolant pump through the cold-side of the thermoelectric generator for a predetermined length of time after shut down of the internal combustion engine; wherein the auxiliary coolant pump is powered by electricity generated by the thermoelectric generator.

The method may further include the step of bypassing the heated coolant from the transmission heat exchanger when the temperature of the transmission fluid reaches a predetermined temperature.

The method may further include the step of increasing the flowrate of the coolant through the cold-side of the thermoelectric generator if the temperature of the coolant immediately upstream of the thermoelectric generator is greater than a predetermined inlet temperature or if the temperature of the heated coolant immediately downstream of the thermoelectric generator is greater than a predetermined outlet temperature.

The method may further include the steps of decreasing the flowrate of the coolant through the cold-side of the thermoelectric generator if the temperature of the coolant immediately upstream of the thermoelectric generator is lower than a predetermined inlet temperature or if the temperature of the heated coolant immediately downstream of the thermoelectric generator is lower than a predetermined outlet temperature.

The method may further include steps of circulating the heated coolant exiting the cold-side of the thermoelectric generator through the transmission heat exchanger when the transmission fluid is less than a predetermined temperature, and bypassing the heated coolant exiting the cold-side of the thermoelectric generator from the transmission heat exchanger when the transmission fluid is greater than a predetermined temperature.

The method may further include steps of circulating the heated coolant exiting the cold-side of the thermoelectric generator through the transmission heat exchanger for a predetermined length of time after shut down of the internal combustion engine.

Further aspects, examples, and advantages will become apparent by reference to the following description and appended drawings.

BRIEF DESCRIPTION OF THE DRAWINGS

The above and other aspects will become more apparent and more readily appreciated from the following description of exemplary embodiments, taken in conjunction with the accompanying drawings in which.

DESCRIPTION

Figure 1:
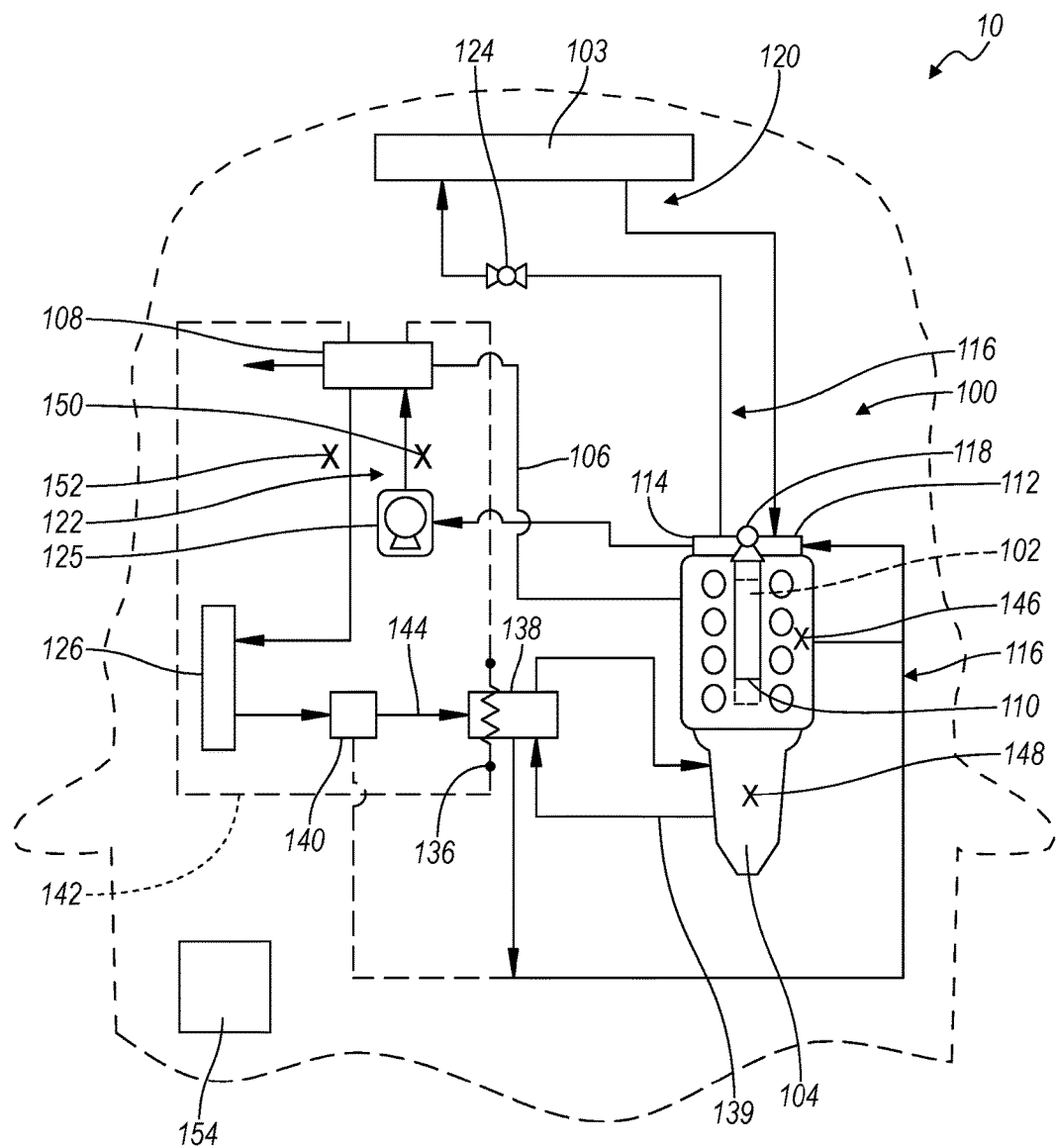
FIG. 1 is a schematic diagram of a motor vehicle having a system for capturing waste heat from the engine to warm a transmission, in accordance with the present invention.

The following description is merely exemplary in nature and is not intended to limit the present disclosure, applications, or uses. Referring to the Figures, wherein like reference numerals correspond to like or similar elements throughout the figures. FIG. 1 is a schematic diagram of a motor vehicle 10 having a system 100 for capturing waste heat from an engine 102 and transferring the waste heat to a transmission 104. System 100 utilizing a thermoelectric generator 108 to capture the waste heat from the engine as will be described in greater detail below.

The motor vehicle 10 includes an internal combustion engine 102 which is coupled to an automatic transmission 104 for transmittal of torque from the internal combustion engine 102 to the transmission 104. The internal combustion engine 102 may be part of a hybrid powertrain where the engine 102 may be used to directly propel the vehicle 10 or drive a generator which produces electricity to power an electric motor. While an internal combustion engine 102 (which includes engines that operates on gasoline, diesel, natural gas, and/or alcohol) is disclosed as an example, other power sources that may generate a hot exhaust gas, such as a solid oxide fuel cell generating a hot tail gas, may be included without departing from the scope of the present invention.

The system 100 for capturing waste heat from the engine 102 and transferring the waste heat to the transmission 104 includes an exhaust gas conduit 106, a coolant circuit 116, a thermoelectric generator 108. The exhaust gas conduit 106 is provided to convey hot combustion gas from the internal combustion engine 102 away from the vehicle 10. The coolant circuit 116 is provided to remove waste heat from the internal combustion engine 102. The thermoelectric generator 108 is provided in cooperation with the coolant circuit 116 to capture the waste heat in the combustion gas for beneficial use in other systems of the vehicle 10, such as providing supplementary heat to the passenger compartment, to warm the engine 102, and/or transmission 104 during cold startups.

The coolant circuit 116 includes an engine coolant passageway 110 in fluid communication with an engine coolant inlet 112 and an engine coolant outlet 114. To manage the heat generated by the internal combustion engine 102, a coolant is circulated through the coolant passageway 110 to remove excess heat generated by the operation of the internal combustion engine 102. The coolant may be that of any coolant commonly used in internal combustion engines including, but not limited to, water, ethylene glycol, and propylene glycol and mixtures thereof.

The coolant circuit 116 has a primary coolant pump 118 disposed downstream of the coolant outlet 114 and is configured to continuously circulate the coolant through the coolant circuit 116, including the engine coolant passageway 110. As the coolant circulates through the internal combustion engine 102, between the coolant inlet 112 and the coolant outlet 114, heat generated through the operation of the internal combustion engine 102 is transferred to the coolant. The primary coolant pump 118 may be a mechanical pump driven by the internal combustion engine 102 or an electrical pump powered by the vehicle's electric system.

As shown in FIG. 1, the coolant circuit 116 includes a cooling loop 120 and a heating loop 122. The primary coolant pump 118 is configured to circulate the coolant exiting the engine coolant outlet 114 through the cooling loop 120 and/or heating loop 122 and back to the engine coolant inlet 112. The cooling loop 120 includes a radiator 103 which dissipates excess waste heat from the engine 102 to the atmosphere. During initial start-up of the engine 102, it is desirable for the internal combustion engine 102 to reach normal operating temperature as quickly as possible in order to reduce emissions and increase efficiency.

A thermostatic valve 124 is provided downstream of the coolant outlet 114 in the cooling loop 120 to restrict the flow of coolant exiting the coolant outlet 114 to the radiator 103 for quicker engine warmup during cold starts. The thermostatic valve 124 restricts coolant flow to the radiator 103 until the temperature of the coolant exiting the internal combustion engine 102 reaches a predetermined temperature, such as the desired operating temperature of the engine 102 for efficient performance. Once the internal combustion engine 102 reaches the desired operating temperature, the thermostatic valve 124 selectively switches to an open position and allows coolant flow in the cooling loop 120 to circulate through the radiator 103 for the dissipation of excess waste heat to the ambient air.

The heating loop 122 provides heat to the passenger compartment of the motor vehicle 10. The heating loop 122 includes a heater core 126 disposed downstream of and in fluid communication with the engine coolant outlet 114 of the internal combustion engine 102. The heater core 126 may be that of a tube and fin type, a plate and fin, or any other known heat exchanger configured to transfers heat from the coolant to a flow of air that is circulated through an interior cabin area for passenger comfort. The flowrate of coolant through the heating loop 122 may be augmented by an auxiliary pump 125, which is located downstream of the coolant outlet 114 and upstream of the heater core 126. The auxiliary pump 125 may include any suitable size and/or style of fluid pump, and is preferably but not necessarily electrically driven, and may include, for example, a 12-volt fluid pump.

Figure 2:
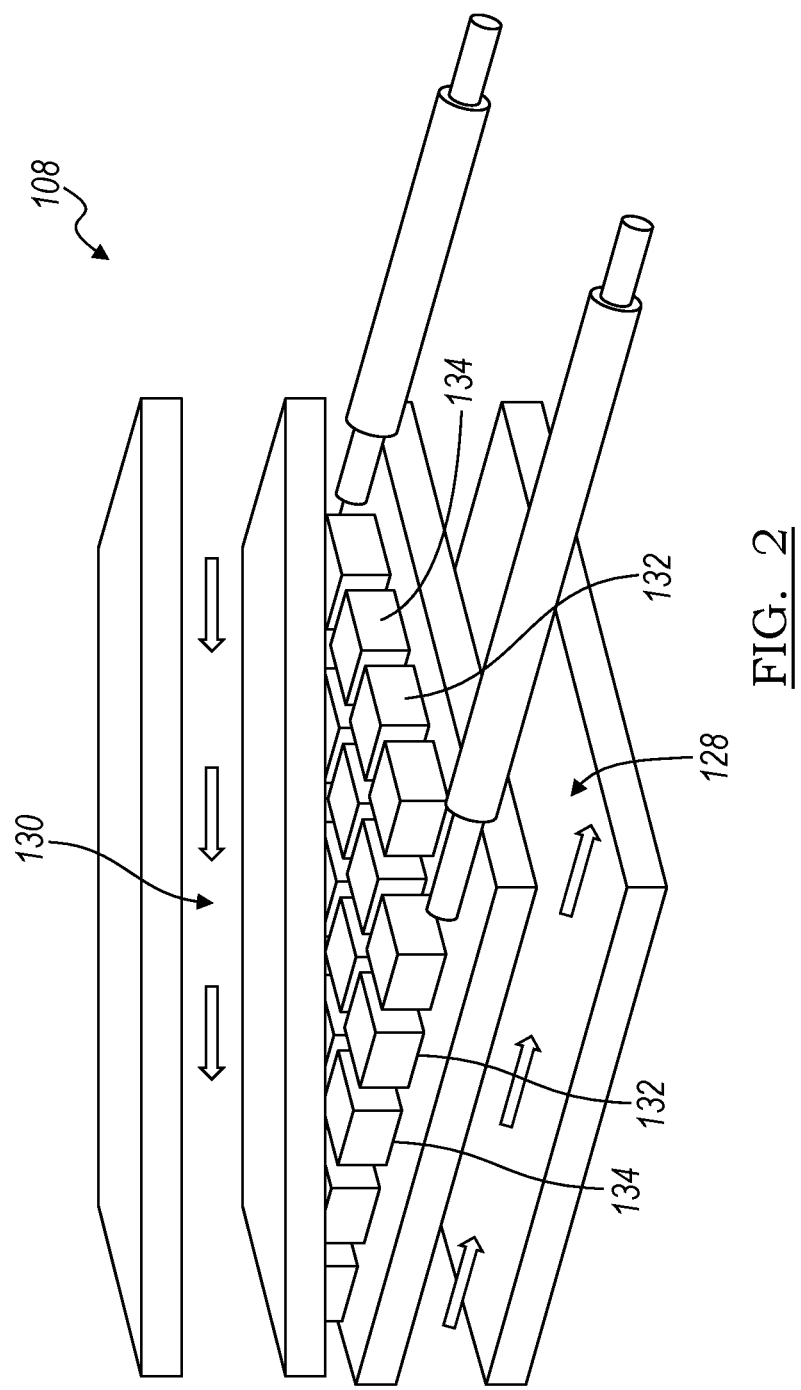
FIG. 2 is perspective cut-away view of an exemplary thermoelectric generator for capturing waste heat from the engine, in accordance with the present invention.

The thermoelectric generator 108 is disposed in the heating loop 122 downstream of the auxiliary pump 125 and upstream of the heater core 126. The exemplary thermoelectric generator 108 shown in FIG. 2 includes two dissimilar thermoelectric materials; an n-type 132 (negatively charged carriers) and a p-type 134 (positively charged carriers) semiconductors. The two dissimilar thermoelectric materials produce a direct electric current when there is a temperature gradient between the hot-side 128 and the cold-side 130 of the thermoelectric generator 108. Generally, the voltage is proportional to the temperature difference between the hot-side 128 and cold-side 130; and the amount of current exiting the thermoelectric generator 108 is a function of the internal electrical resistance of the n-type 132 and p-type 134 semiconductors and an external load resistance.

For use in the motor vehicle 10, the thermoelectric generator 108 may generate electricity by configuring the hot-side 128 to salvage heat from the hot exhaust gas from the internal combustion engine 102 and adapting the cold side to be exposed to the relatively colder coolant flow downstream of the auxiliary pump 125. The hot-side 128 may be in non-contact thermal communication with the cold-side 130 in which heat from the hot exhaust is transferred to the coolant flowing through the cold-side 130. Non-contact thermal communication means that the flow of hot exhaust gases flowing through the hot-side 128 does not intermingle with the coolant flowing through the cold side of the thermoelectric generator 108; however, heat energy is transferred from the higher temperature exhaust gas to the lower temperature coolant. The flow of the hot exhaust gases through the thermoelectric generator 108 may be in cocurrent, counter current flow, and/or cross-flow with respect to the coolant flow.

The extra heat transferred to the coolant exiting the thermoelectric generator 108 from the hot exhaust gas may be put to beneficial use such as providing supplementary heat to the passenger compartment. This is especially beneficial for vehicles having smaller fuel efficient engines or hybrid vehicles, which may not be able to produce sufficient waste heat to provide adequate passenger comfort during cold winter months. The extra heat may also be used to pre-heat or warm the transmission 104 during initial vehicle start up. Warming the transmission 104 during initial startup improves efficiency by lowering the viscosity of the transmission fluid resulting in reduced spin loss and increased fuel efficiency, and possibly increased the operational life of the transmission 104.

The electricity produced by the thermoelectric generator 108 may be also be put to beneficial use, such as providing supplementary heat to the passenger compartment, preheating the transmission 104 or even the internal combustion engine 102 for faster warm up, and/or powering electrical components such as a coolant pump. An electrical heater element 136 may be placed in the second and/or third row seating of sport utility vehicles and passenger vans to provide heat to the rear passengers. An electrical heater element 136 may be disposed in the oil pan of the transmission 104 to be in thermal contact with the transmission fluid. Alternatively, the electrical heater element 136 may be integrated into the transmission fluid heat exchanger 138. The electric heater element 136 may be powered by the electricity generated by the thermoelectric generator 108.

Shown in FIG. 1, a transmission heat exchanger 138 is disposed in the heating loop 122 downstream of the heater core 126 and upstream of the engine coolant inlet 112. The transmission heat exchanger 138 includes a transmission fluid passageway in fluid communication with a transmission fluid outlet and transmission fluid inlet of the transmission 104. A transmission fluid circuit 139 is provided to circulate a portion of transmission fluid from the transmission 104 to the transmission heat exchanger 138 and back to the transmission 104. The transmission fluid circuit 139 is in non-contact thermal communication with the coolant flowing through the transmission heat exchanger 138, whereby heat is transfer from the coolant to the transmission fluid during cold startup.

A bypass valve 140 is provided in the heating loop 122 downstream of the heater core 126 and up stream of the transmission heat exchanger 138. The bypass valve 140 is configured to selectively direct coolant flow through the transmission heat exchanger 138 when the warming of the transmission fluid is desired or bypasses the transmission heat exchanger 138 when the warming of the transmission fluid is not desired. The bypass valve 140 may include, for example, a three port valve having an input for receiving the flow of the coolant downstream of the heater core 126, a first output, and a second output. The first output of the bypass valve 140 is connected to and in fluid communication with a first fluid flow path 142 that bypasses the transmission heat exchanger 138 as shown in dash lines. The second output of the bypass valve 140 is connected to and in fluid communication with a second fluid flow path 144 through the transmission heat exchanger 138 as shown in a heavy solid line. The coolant is in non-contact thermal communication with the transmission fluid flowing through the transmission heat exchanger 138, whereby heat is transfer from the coolant to the transmission fluid.

As shown in FIG. 1, the bypass valve 140 may direct the flow of the coolant along the first fluid flow path 142, thereby bypassing the transmission heat exchanger 138, when the temperature of the engine is below a predetermined temperature. This is to avoid the transmission 104 acting as a heat sink during startup in extreme cold weather. The bypass valve 140 may direct the flow of the engine coolant along the second fluid flow path 144, through the transmission heat exchanger 138, when the temperature of the engine is equal to or greater than the predetermined temperature. The predetermined temperature may be defined as a desired operating temperature of the internal combustion engine 102 or less. It should be appreciated that the exact range and value of the predetermined temperature may differ depending upon the exact size and configuration of the internal combustion engine 102.

The vehicle 10 may include an engine temperature sensor 146 configured for sensing a temperature of the engine coolant exiting the coolant outlet 114, a transmission fluid temperature sensor 148 configured for sensing a temperature of the transmission fluid within the transmission 104, and a thermoelectric generator inlet coolant temperature sensor 150 and a thermoelectric generator outlet coolant temperature sensor 152, each configured for sensing a temperature of the coolant entering and exiting the thermoelectric generator 108, respectively. The temperature sensors 146, 148, 150, 152 may include any suitable sensor capable of sensing the temperature of engine coolant and/or transmission fluid, depending the application. The temperature sensors 146, 148, 150, 152 may be electronically coupled to a control module 154, which may include, but is not limited, to a non-general computer having all necessary hardware, software, control algorithms, communication links, memory, etc., necessary to communicate with the temperature sensors 146, 148, 150, 152 and actuate the bypass valve 140. The control module 154 may receive a signal from the temperature sensors 146, 148, 150, 152 and sends a signal to the bypass valve 140 to direct the flow of the engine coolant along one of the first fluid flow path 142, thereby bypassing the transmission heat exchanger 138, or the second fluid flow path 144, thereby warming the transmission fluid flowing through the transmission heat exchanger 138.

A method of warming a transmission 104 on a vehicle 10 having an internal combustion engine 102 is provided. The method includes starting the internal combustion engine 102 and producing a hot exhaust gas as a result of operation, and circulating a coolant through the coolant circuit 116 in fluid communication with the internal combustion engine 102. The temperature of the engine coolant is continuously measured. The flow of coolant through the radiator 103 in the cooling loop 120 is restricted until the coolant reaches a predetermined temperature, which is approximately 180° F. to 220° F., depending on the type and size of the engine 102 as well as the purpose of the vehicle 10.

The hot exhaust gas is passed through the hot-side 128 of a thermoelectric generator 108 and the relatively lower temperature coolant is passed through the cold-side 130 of the thermoelectric generator 108 in the heating loop 122, thereby generating an electric current and transferring heat from the exhaust gas to the coolant in the heating loop 122.

In the heating loop 122, when the ambient air temperature is above a predetermined ambient temperature or when the coolant exiting the internal combustion engine 102 is above a predetermined engine temperature, then the heated coolant exiting the cold-side 130 of the thermoelectric generator 108 is circulated through a transmission heat exchanger 138 to transfer heat from the coolant to the transmission fluid. If the ambient air temperature is below a predetermined ambient temperature, such as 30° F. to 35° F., it is generally not desirable to circulate the heated coolant through the transmission heat exchanger 138, because the transmission 104 would be too great of a heat sink and it would take a relatively long time to bring the engine 102 up to running temperature.

The method may further includes disposing an electrical heating element 136 in thermal communication with the transmission fluid and using the electric current generated by the thermoelectric generator 108 to power the electrical heating element 136. Once the temperature of the transmission fluid is up to operating temperature or a predetermined temperature, which may be higher or lower than the normal operating temperature of the transmission, the heated coolant is bypassed from the transmission heat exchanger 138.

To safe guard the thermoelectric generator 108 from overheating and boiling the coolant flowing therethrough, the auxiliary pump 125 may be used to increase the flowrate of coolant through the thermoelectric generator 108 to remove heat from the thermoelectric generator 108. The auxiliary pump 125 may increase the flowrate of the coolant through the cold-side 130 of the thermoelectric generator 108 to a first increased flow rate (F1) when the temperature of the coolant immediately upstream of the thermoelectric generator 108 is greater than a predetermined inlet temperature, and to further increase the flowrate of coolant to a second increased flow rate (F2) when the temperature of the heated coolant immediately downstream of the thermoelectric generator 108 is greater than a predetermined outlet temperature. The second increased flowrate is greater than the first increased flow rate (F2>F1). The thermoelectric generator 108 predetermined inlet and outlet temperatures may be set based on the manufacturer's safety rating of the thermoelectric generator 108 and boiling point of coolant used.

After shutdown of the internal combustion engine 102, the auxiliary pump 125 continues to pump coolant through the cold-side 130 of the thermoelectric generator 108 for a predetermined length, approximately 2 to 4 minutes to avoid the coolant trapped in the thermoelectric generator 108 from boiling.

If the temperature of the coolant immediately upstream of the thermoelectric generator 108 is lower than a desirable inlet temperature or if the temperature of the heated coolant immediately downstream of the thermoelectric generator 108 is lower than a desirable outlet temperature, then the flowrate of coolant through the cold-side 130 of the thermoelectric generator 108 may be decrease in order to provide adequate contact time for greater heat transferred to the coolant from the exhaust gas flow through the hot-side.

If the transmission fluid is less than the normal operating temperature or less than a lower predetermined temperature, then the heated coolant exiting the cold-side 130 of the thermoelectric generator 108 maybe routed through the transmission heat exchanger 138 as applicable. If the transmission fluid is greater than a predetermined temperature, then the heated coolant exiting the cold-side 130 of the thermoelectric generator 108 is bypassed from the transmission heat exchanger 138.

The method may include the step of circulating the heated coolant exiting the cold-side 130 of the thermoelectric generator 108 through a heater core 126.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The following is claimed:

1. A vehicle comprising:
    an engine having an engine coolant passageway configured for a flow of a coolant therethrough, wherein the engine coolant passageway includes a coolant inlet and a coolant outlet;
    a transmission coupled to the engine, wherein the transmission includes a transmission fluid inlet and a transmission fluid outlet;
    an exhaust conduit operable to convey a flow of an exhaust gas away from the engine;
    a coolant circuit in fluid communication with the coolant outlet of the engine;
    a thermoelectric generator having a hot-side in thermal contact with the exhaust conduit and a cold-side in thermal contact with the coolant circuit downstream of the coolant outlet, whereby an electric current is generated from the temperature gradient between the higher temperature exhaust gas flow through the exhaust conduit to the relatively lower temperature coolant circulating through the coolant circuit and heat is transferred from the higher temperature exhaust gas to the relatively lower temperature coolant; and
    a transmission heat exchanger disposed in the coolant circuit downstream of the thermoelectric generator, wherein the transmission heat exchanger includes a transmission fluid passageway in fluid communication with the transmission fluid outlet and transmission fluid inlet,
    wherein the coolant circuit comprises an auxiliary coolant pump downstream of the engine coolant outlet and upstream of the thermoelectric generator, and
    wherein the auxiliary coolant pump is configured to provide a first flowrate through the thermoelectric generator when the temperature of the coolant immediately prior to the thermoelectric generator is above a first predetermined temperature, and a second flowrate through the thermoelectric generator when the temperature of the coolant immediately after the thermoelectric generator is above a second predetermined temperature higher than the first predetermined temperature, wherein the second flowrate is greater than the first flow rate.

* * * * *